US008244805B2

(12) United States Patent
Hamilton, II et al.

(10) Patent No.: US 8,244,805 B2
(45) Date of Patent: Aug. 14, 2012

(54) COMMUNICATION INTEGRATION BETWEEN A VIRTUAL UNIVERSE AND AN EXTERNAL DEVICE

(75) Inventors: Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 12/144,776

(22) Filed: Jun. 24, 2008

(65) Prior Publication Data

US 2009/0319668 A1    Dec. 24, 2009

(51) Int. Cl.
*G06F 15/16* (2006.01)
*H04N 7/14* (2006.01)
*G06F 17/30* (2006.01)

(52) U.S. Cl. ........ 709/204; 709/205; 709/206; 709/207; 709/227; 709/228; 348/14.1

(58) Field of Classification Search .......... 709/204–207, 709/227–230
See application file for complete search history.

(56) References Cited

U.S. PATENT DOCUMENTS

| | | | |
|---|---|---|---|
| 6,643,639 B2 | 11/2003 | Biebesheimer et al. | |
| 6,693,651 B2 | 2/2004 | Biebesheimer et al. | |
| 6,701,311 B2 | 3/2004 | Biebesheimer et al. | |
| 6,778,193 B2 | 8/2004 | Biebesheimer et al. | |
| 6,785,676 B2 | 8/2004 | Oblinger | |
| 6,853,998 B2 | 2/2005 | Biebesheimer et al. | |
| 6,873,990 B2 | 3/2005 | Oblinger | |
| 7,546,343 B2 * | 6/2009 | Benco et al. | 709/204 |
| 7,685,017 B2 * | 3/2010 | Matsui et al. | 705/14.19 |
| 7,979,574 B2 * | 7/2011 | Gillo et al. | 709/238 |
| 2002/0083119 A1 * | 6/2002 | Matsui et al. | 709/200 |
| 2004/0205176 A1 * | 10/2004 | Ting et al. | 709/223 |
| 2007/0136422 A1 * | 6/2007 | Ohtani et al. | 709/204 |
| 2008/0025307 A1 * | 1/2008 | Preiss et al. | 370/392 |
| 2008/0052242 A1 * | 2/2008 | Merritt et al. | 705/59 |
| 2008/0214253 A1 * | 9/2008 | Gillo et al. | 463/1 |
| 2008/0215679 A1 * | 9/2008 | Gillo et al. | 709/204 |

(Continued)

OTHER PUBLICATIONS

IBM-OmniFind Enterprise Edition—Text Analytics and UIMA, "OmniFind Enterprise Edition", Retrieved on Mar. 6, 2008 from: http://www-306.ibm.com/software/data/enterprise-search/omnifind-enterprise/uima.html, 1 page.

(Continued)

*Primary Examiner* — Ashok Patel
*Assistant Examiner* — Linglan Edwards
(74) *Attorney, Agent, or Firm* — Hoffman Warnick LLC; William Schiesser

(57) ABSTRACT

An approach that provides real-time communication integration between a virtual universe and an external source is described. In one embodiment, there is a real-time communication integration interface tool that provides real-time communication integration between a virtual universe and a communication device external to the virtual universe. In this embodiment, there is a communication request component configured to receive a request to initiate a communication between a first resident that is on-line in the virtual universe and a second resident that is logged out of the virtual universe via the communication device. A communication link component is configured to establish a communication link between the virtual universe and the communication device in response to receiving the request.

15 Claims, 5 Drawing Sheets

U.S. PATENT DOCUMENTS

| | | | | |
|---|---|---|---|---|
| 2008/0215994 | A1* | 9/2008 | Harrison et al. | 715/757 |
| 2008/0235582 | A1* | 9/2008 | Zalewski et al. | 715/716 |
| 2008/0263460 | A1* | 10/2008 | Altberg et al. | 715/757 |
| 2009/0019367 | A1* | 1/2009 | Cavagnari et al. | 715/716 |
| 2009/0089439 | A1* | 4/2009 | Benco et al. | 709/228 |
| 2009/0158170 | A1* | 6/2009 | Narayanan et al. | 715/753 |

OTHER PUBLICATIONS

Nuance—Speech Solutions—"Nuance Recognizer V9", Retrieved from: http://www.nuance.com/recognizer/, 2008 Nuance Communications, Inc.

Chang, Office Communication for U.S. Appl. No. 12/501,933 dated Apr. 13, 2012, 26 pages.

Dagiuklas et al., "Seamless Multimedia Network and Service Access Over All-IP Based Infrastructures: The EVOLUTE Approach," Oct. 2003, 27 pages, European Transactions on Telecommunications Journal.

Calvagna et al., "A User-Centric Analysis of Vertical Handovers," Oct. 2004, pp. 137-146, WMASH 2004.

http://en.wikipedia.org/wiki/Roaming. "Roaming" from Wikipedia Enclyclopedia, 2008, 6 pages, Dec. 31.

Siddiqui et al., "Mobility Management Across Hybrid Wireless Networks: Trends and Challenges," 2006, pp. 1363-1385, Computer Communications 29, Dec. 31.

* cited by examiner

COMMUNICATION INTEGRATION BETWEEN A VIRTUAL UNIVERSE AND AN EXTERNAL DEVICE

FIELD OF THE INVENTION

This invention relates generally to communications and more specifically to real-time communication integration between a virtual universe and an external source.

BACKGROUND OF THE INVENTION

Virtual universes or virtual worlds are computer-based simulated environments intended for its users or residents to inhabit and interact via avatars, which are personas or representations of the users of the virtual universes and generally take the form of two-dimensional or three-dimensional human or fantastical representations of a person's self. These types of virtual universes are now most common in massively multiplayer online games such as Second Life which is a trademark of Linden Research in the United States. Avatars in these types of virtual universes, which can number well over a million, have a wide range of business and social experiences.

Communication is paramount for having an agreeable business and/or social experience. A typical virtual universe allows residents to communicate through communication channels that include email, instant messaging, chatting, teleport requests and visual interactions which can include gestures and postures. These communication channels work quite well for residents that are logged into the virtual universe for a substantial period of time. However, there are large numbers of residents that are not logged into the virtual universe for long periods of time making them inaccessible for the most part until they log back into the virtual universe. Therefore, it is difficult for these residents that are not logged into the virtual universe at all times to maintain a continuous presence, which causes sharp divisions between residents that spend large portions of their days in the virtual universe as compared to those residents that reside temporarily in the universe. These divisions can impair the ability for all residents of the virtual universe to obtain the most of their business and/or social experience within the virtual universe.

SUMMARY OF THE INVENTION

In one embodiment, there is a method for providing real-time communication integration between a virtual universe and a communication device external to the virtual universe. In this embodiment, the method comprises: receiving a request to initiate a communication between a first resident that is on-line in the virtual universe and a second resident that is logged out of the virtual universe via the communication device; and establishing a communication link between the virtual universe and the communication device in response to receiving the request.

In a second embodiment, there is a computer system for providing real-time communication integration between a virtual universe and a communication device external to the virtual universe. In this embodiment, the system comprises at least one processing unit and memory operably associated with the at least one processing unit. A real-time communication integration interface tool is storable in memory and executable by the at least one processing unit. The real-time communication integration interface tool comprises a communication request component configured to receive a request to initiate a communication between a first resident that is on-line in the virtual universe and a second resident that is logged out of the virtual universe via the communication device. A communication link component is configured to establish a communication link between the virtual universe and the communication device in response to receiving the request.

In a third embodiment, there is a computer-readable medium storing computer instructions, which when executed, enables a computer system to provide real-time communication integration between a virtual universe and a communication device external to the virtual universe. In this embodiment, the computer instructions comprise: receiving a request to initiate a communication between a first resident that is on-line in the virtual universe and a second resident that is logged out of the virtual universe via the communication device; and establishing a communication link between the virtual universe and the communication device in response to receiving the request.

In a fourth embodiment, there is a method for deploying a real-time communication integration interface tool for use in a computer system that provides real-time communication integration between a virtual universe and a communication device external to the virtual universe. In this embodiment, a computer infrastructure is provided and is operable to: receive a request to initiate a communication between a first resident that is on-line in the virtual universe and a second resident that is logged out of the virtual universe via the communication device; and establish a communication link between the virtual universe and the communication device in response to receiving the request.

DETAILED DESCRIPTION OF THE INVENTION

Embodiments of this invention are directed to establishing communication links between residents within a virtual universe and residents who are temporarily not logged into the virtual universe, such that residents not logged in are seamlessly integrated into the virtual universe temporarily, and residents within the virtual universe are represented in a standard, non virtual universe communication interface. In these embodiments, a real-time communication integration interface tool provides the capability to establish communication links between the virtual universe and communication devices that are external to the virtual universe (i.e., standard real world communication devices) such that a resident that is not logged into the virtual universe can be summoned back into the virtual universe for the purpose of communication or collaboration in the three-dimensional world of the virtual universe. Conversely, the real-time communication integration interface tool can be used by a resident that is not logged into the virtual universe to summon a resident that is logged into the virtual universe for the purpose of communication or collaboration in the real world.

Benefits of using the real-time communication integration interface tool include but are not limited to: enhanced interactions between residents inside and outside the virtual universe; greater flexibility in scheduling, planning, and executing activities with other residents of a virtual universe; greater accessibility of residents to other residents of the virtual universe; greater ability to maintain participation in on-demand enterprises within and outside the virtual universe; and greater ability to participate in the virtual universe when access to the virtual universe is limited or intermittent. Other benefits are that the real-time communication integration interface tool allows a virtual universe resident to receive communications from outside the virtual universe using a virtual universe client, and allows a virtual universe non-resident to communicate with virtual universe residents who are otherwise not available for communication.

Figure 1:
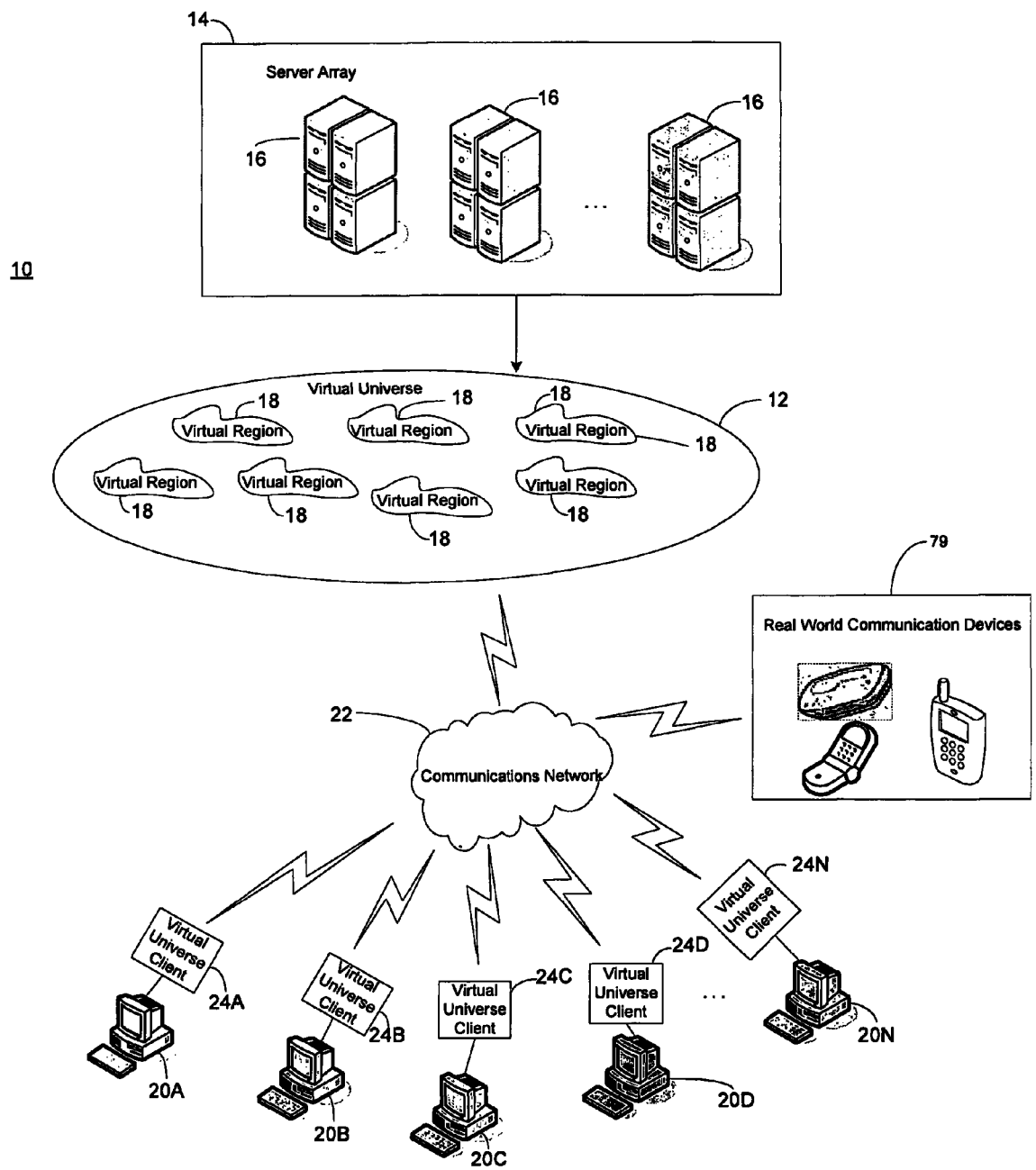
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a real-time communication integration interface tool can be utilized. As shown in FIG. 1, the networking environment 10 comprises a server array or grid 14 comprising a plurality of servers 16 each responsible for managing a sliver of virtual real estate within the virtual universe 12. A virtual universe provided by a typical massively multiplayer online game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20N (hereinafter referred generally as 20) interact with the virtual universe 12 through a communication network 22 via virtual universe clients 24A-24N (hereinafter referred generally as 24) that resides in the computers, respectively. In addition, FIG. 1 shows that users operating real world communication devices (e.g., cell phones, land-line phones, pagers, etc.) 79 interact with the virtual universe 12 through the communication network 22 via a real-time communication integration interface tool (not shown in this figure). Below are further details of the virtual universe 12, server array 14, and virtual universe client 24, including the use of the real-time communication integration interface tool to facilitate communication between the virtual universe 12 and the real world communication devices 79.

Figure 2:
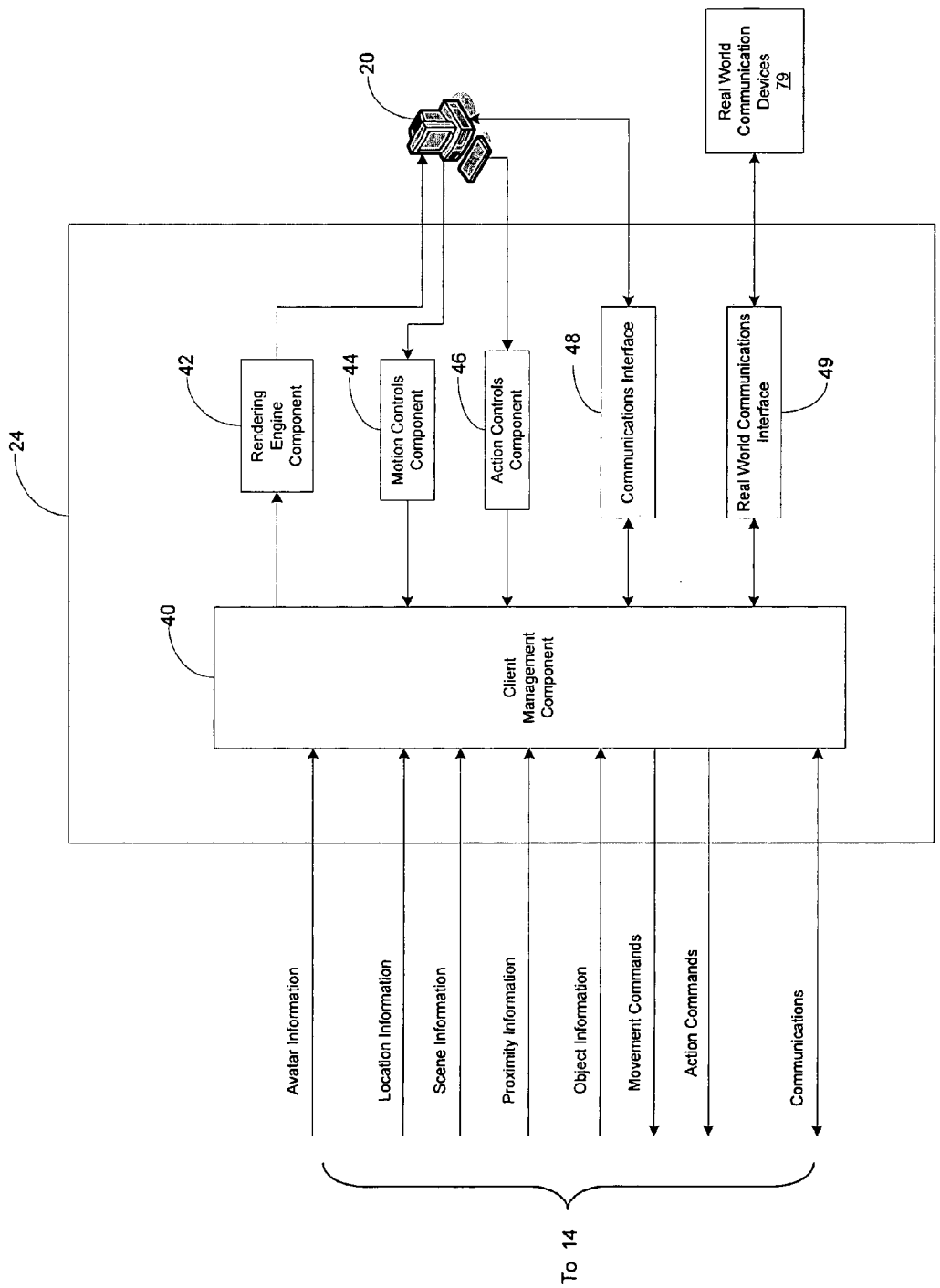
FIG. 2 shows a more detailed view of the virtual universe client shown in FIG. 1.

FIG. 2 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and electronic mail (e-mail).

FIG. 2 shows the various types of information received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or land he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., invoking, pushing, picking up, etc.). FIG. 2 also shows the movement commands and action commands that are generated by the user are sent to the server array via the client management component 40, as well as the communications that can be sent to the users of other avatars within the virtual universe. The communications can include communications sent to the server array 14 from users operating real world communication devices 79. Below are further details of how communications can be sent to the server array 14 from users operating real world communication devices 79.

Figure 3:
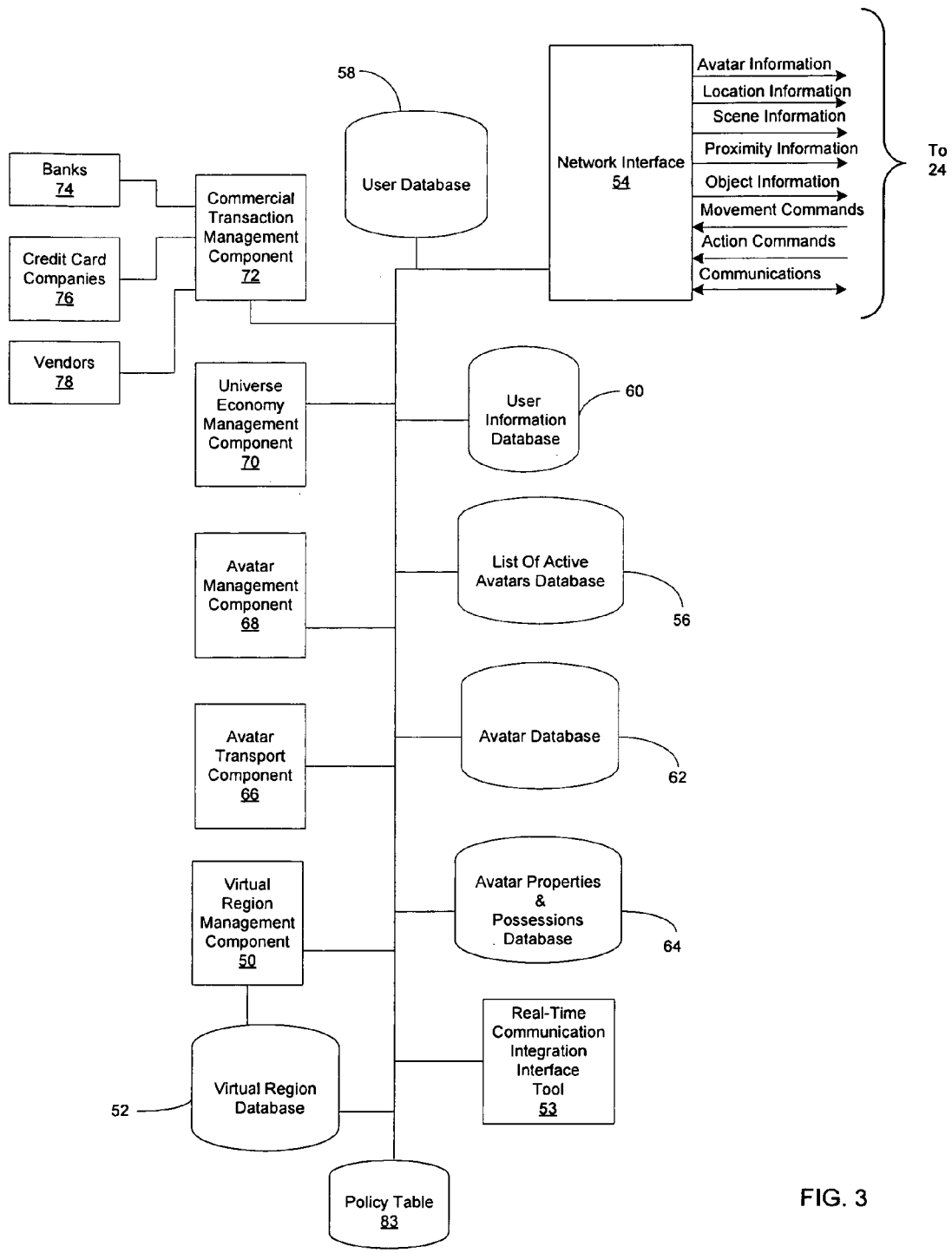
FIG. 3 shows a more detailed view of some of the functionalities provided by the server array shown in FIG. 1.

FIG. 3 shows a more detailed view of some of the functionalities provided by the server array 14 shown in FIG. 1. In particular, FIG. 3 shows a virtual region management component 50 that manages a virtual region within the virtual universe. In particular, the virtual region management component 50 manages what happens in a particular region such as the type of landscape in that region, the number of homes, commercial zones, boutiques, streets, parks, restaurants, etc. For example, the virtual region management component 50 would allow the owner of a particular region or establishment within the region to specify requirements for entering or remaining within the region that could potentially affect certain avatar characteristics. In addition, the virtual region management component 50 would allow the owner of a particular region or establishment to provide a textual description that describes the area in more detail so that the avatars can ascertain if there will be a potential effect on their use of specific inventory items within that region. Those skilled in the art will recognize that the virtual region management component 50 can manage many other facets within the virtual region.

A virtual region database 52 stores information on all of the specifics in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular land within the virtual region 18.

A real-time communication integration interface tool 53 provides real-time communication integration between the virtual universe 12 and a communication device external to the virtual universe. In particular, the real-time communication integration interface tool 53 is configured to establish communication links between residents within the virtual universe 12 and residents who are temporarily not logged into the virtual universe. Below is a more detailed discussion of the real-time communication integration interface tool 53 and how it performs the above-mentioned functions.

A policy table 83 can be used by the real-time communication integration interface tool 53 to determine preferred communication paths that have been designated by residents as being acceptable mediums in which they can be reached for communications in and out of the virtual universe 12. For example, if a resident being summoned for a communication is logged out of the virtual universe 12, then the policy table 83 will have a listing of communications paths that have been designated and approved by that resident as being an acceptable medium in which a resident within the virtual universe can try to use to communicate with that logged out resident.

FIG. 3 shows a network interface 54 that enables the server array 14 to interact with the virtual universe client 24 residing on computer 20. In particular, the network interface 54 communicates avatar, location, scene, proximity and object information to the user through the virtual universe client 24 and receives movement and action commands as well as communications from the user via the universe client.

As shown in FIG. 3, there are several different databases for storing information. In particular, database 56 contains a list of all the avatars that are online in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions.

Databases 62 and 64 contain information on the avatars of the users that reside (i.e., the residents) in the virtual universe 12. In one embodiment, database 62 contains information such as all of the avatars that a user may have, the profile of each avatar, avatar characteristics (e.g., appearance, voice and movement features). In another embodiment, it is possible to have the policy table 83 stored within avatar database 62 and accessed by having a reference point to it. Database 64 contains an inventory of items that they own, and these inventory items may be bought, sold, traded, etc., during operation of the virtual universe. Items in a typical inventory may include clothing, virtual pets, vehicles, electronic media (e.g., music files), or other possessions. Those skilled in the art will recognize that this listing of inventory items is illustrative of possible items and is not exhaustive. For example, other inventory items may include graphics files, sound files, animations, electronic documents, video files, avatar accessories, avatar body parts, avatar tools or other objects, avatar gestures, automated avatars, calling cards, landmarks (such as bookmarked locations) or other geographical information, items in a lost and found folder, note cards, photos and photo albums, scripts (e.g. macros to perform actions), textures, deleted items, or any other type of item.

Each inventory item may represent a piece of executable code or other data which may be rendered in some fashion to the user during a session in the virtual universe. Clothing inventory, for example, may be rendered as clothing for the user's avatar while a virtual dog, in another example, may render as an automated avatar that follows the user's avatar within the virtual universe. In other embodiments, inventory items may be represented as non-executable data that may be used by the virtual universe to render the inventory item for the user when needed. The contents of a user's inventory are typically displayed in a hierarchical manner similar to an operating system's display of folders, subfolders, and files within a files system.

As virtual universes become more mainstream within a business setting, it is conceivable that users will want to have public and private inventories for their avatar in order to protect unwanted invasion of confidential and proprietary information. Therefore, in one embodiment, the database 62 may contain public and private inventories in order to account for various business and social encounters that need to be shielded from unauthorized parties.

Those skilled in the art will recognize that databases 58-64 may contain additional information if desired. Although the above information is shown in FIG. 3 as being stored in databases, those skilled in the art will recognize that other means of storing information can be utilized.

An avatar transport component 66 enables users to transport, which as mentioned above, allows avatars to transport through space from one point to another point, instantaneously. As a result, an avatar could for example travel from a business region to an entertainment region to hear a concert.

An avatar management component 68 keeps track of what online avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. For example, an avatar might make a purchase for a service using the virtual universe currency. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78.

Figure 4:
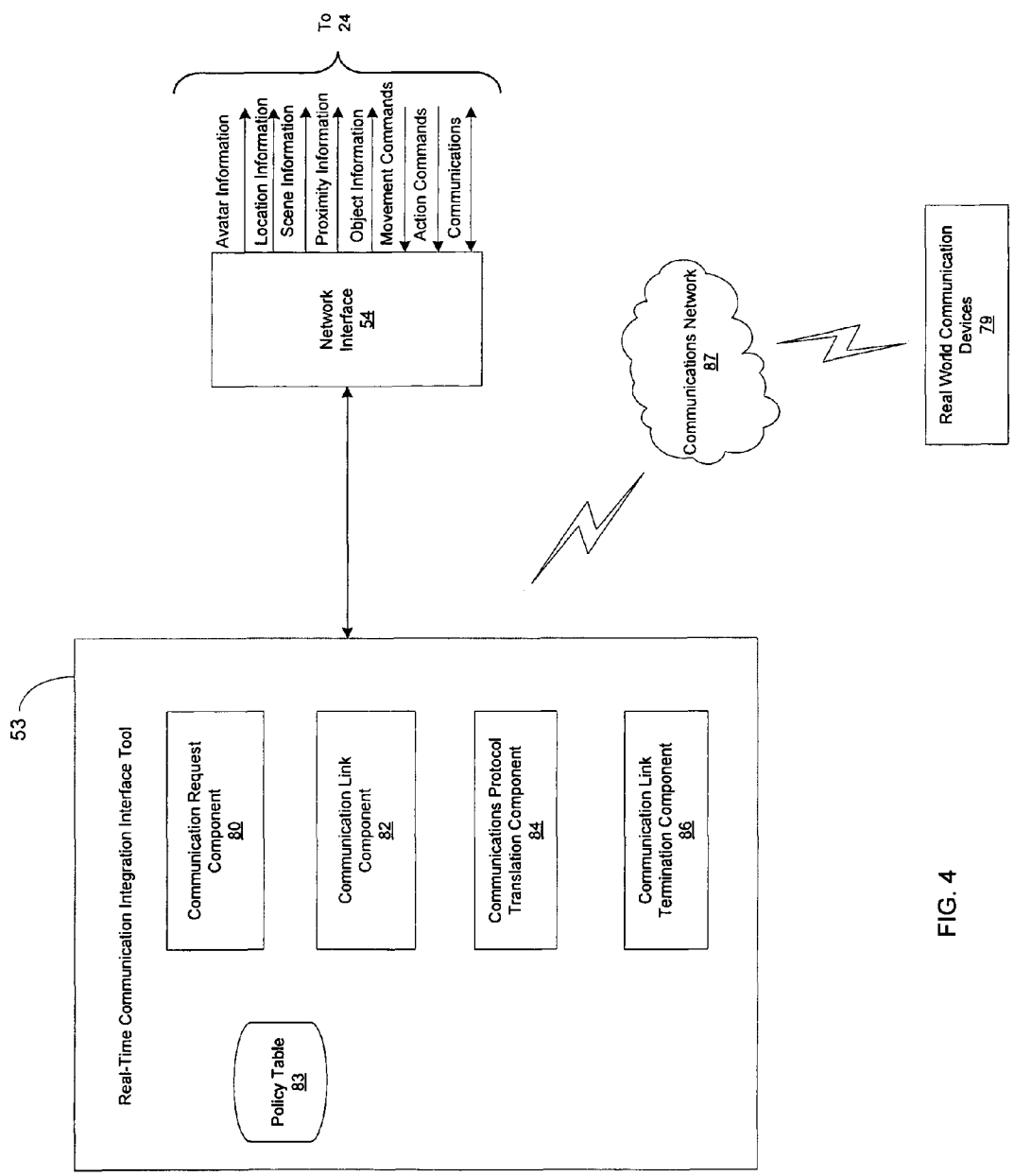
FIG. 4 shows a real-time communication integration interface tool according to one embodiment of this invention that operates in the environment shown in FIG. 1.

FIG. 4 shows a more detailed view of the real-time communication integration interface tool 53. As mentioned above, the real-time communication integration interface tool 53 provides real-time communication integration between the virtual universe 12 and a communication device external to the virtual universe. In FIG. 4, the real-time communication integration interface tool 53 resides on the same computer system as the server 14 and communicates directly to the virtual universe and its residents via the virtual universe client 24 and external communication devices 79 in the real world. In other embodiments, the real-time communication integration interface tool 53 might reside on the same computers as the virtual universe client 24, have components that reside on both the server 14 and virtual universe client 24, or reside on separate computers in direct communication with the virtual universe servers 16 and virtual universe clients 24.

FIG. 4 shows that the real-time communication integration interface tool 53 comprises a communication request component 80 configured to receive a request to initiate a communication between a first resident that is on-line in the virtual universe 12 and a second resident that is logged out of the virtual universe through a real world communication device 79 via a communication network 87. The real world communication device 79 can be any communication device or communication path that people in the real world can use to communicate with each other. An illustrative but non-exhaustive list of real world communication device includes telecommunication devices (e.g., phones), chatting, instant messaging, emailing, blogging, video communications (e.g., video streaming) and file sharing.

The communication request component 80 is configured to issue a summons to either residents in the virtual universe or residents logged out of the virtual universe 12 and that are in the real world. The summons indicates that there is a desire to initiate a communication between a resident in the virtual universe 12 and a resident that is logged out of the virtual universe. The summons can be issued by a resident in the virtual universe 12 via its avatar to a resident that is logged out. Conversely, the resident that is logged out of the virtual universe 12 may issue a summons to a resident logged in the virtual universe. Those skilled in the art will recognize that the communication request component 80 can be used to issue a communication summons to and from a resident that is logged out of virtual universe 12 but may be logged into another virtual world environment or a social network environment.

The real-time communication integration interface tool 53 further comprises a communication link component 82 configured to establish a communication link between the virtual universe 12 and the communication device 79 in response to receiving a summons from a resident. In one embodiment, the communication link component 82 uses a policy table 83 to determine a preferred communication path for contacting the resident that is being summoned. The policy table stores a listing or a set of policies that specify preferred communications paths that have been designated by that resident as being summoned as acceptable mediums in which they can be reached. For example, if the resident being summoned is logged out of the virtual universe 12, then the policy table will have a listing of communications paths that have been designated and approved by that resident as being an acceptable medium in which a resident within the virtual universe can try to use to communicate with that logged out resident. Below is an example of a table that may be stored in the policy table 83 that designates preferred contact methods for a resident that is logged out of the virtual universe 12.

TABLE 1

| Avatar UUID | Preferred Contact Method |
| --- | --- |
| Avatar 1 (day) | Cell Phone |
| Avatar 1 (night) | Email |
| Avatar 2 | Instant Message |
| Group 1 | Cell Phone |
| Avatar 4 | Email |
| Group 2 | Instant Message |

In the example shown in Table 1, if a resident is logged out of the virtual universe 12 and a resident that is logged on and wants to get in touch with the resident in the daytime, then the policy table indicates that the resident that is logged out can be reached by cell phone. The policy table also indicates that the resident's avatar 1 will be accessed. As will be explained below, when a communication link is established, the communication link component 82 will temporarily log in the previously logged out resident in the virtual universe 12. In this example, the resident's avatar 1 will be logged into the virtual universe in response to establishing the communication link between the virtual universe and the communication device. In one embodiment, a rendering of avatar 1 in the virtual universe will occur and it is possible that the cell phone could be rendered also by obtaining the item from the resident's inventory. In addition to rendering avatar 1, it is possible to teleport avatar 1 to the location in the virtual universe 12 in which the summoning resident is currently located.

Table 1 also shows that the preferred contact method can be used for a group of residents comprised of N individuals. In one embodiment, the policy table may indicate which of the N individuals should receive the summons if they are not logged on to the virtual universe and in cases in which only a subset of individuals should be contacted. For example, a resident of a virtual universe may send a request to teleport or other kind of summons to Group 1 (comprised of Rick, Cliff, and James). The policy table may indicate that the request should be sent to Rick by phone and Cliff by instant message, but not to include James in any summonses. As an example, the summonses may appear on computer screens, hand-helds, phones, car displays, TVs, kiosks, and watches. If the resident outside the virtual universe only has access to a text-only device, the resident may be "teleported" into a text-only simulacrum of the virtual universe that optionally describes the virtual universe scene. For example, "You are now in a castle. Avatars in our view: Rick." If the resident outside the virtual universe only has access to an audio-only device, the resident may be teleported into an audio-only simulacrum of the virtual universe that describes the virtual universe scene.

In another embodiment, the communication link component 82 is also configured to verify the identity of the residents prior to establishing the communication link. Well-known verification methods that include but are not limited to use of password, voice recognition, etc., can be used to verify the identities of residents prior to establishing the communication between parties.

As shown in FIG. 4, the real-time communication integration interface tool 53 further comprises a communications protocol translation component 84 configured to translate communication protocols associated with the virtual universe 12 and the external real world communication device 79 to facilitate (i.e., maintain and manage) the communication between a resident that is logged out of the virtual universe and a resident that is logged in. Note that although the description herein is between a resident logged in the virtual universe 12 and a resident logged out, it is possible to have more parties in and out of the virtual universe take part in the established communication. Essentially, the communications protocol translation component 84 translates the protocols associated with the virtual universe 12 into the interface of the real world communication device 79 and alternatively translates the protocols associated with the communication device into the interface of the virtual universe. This capability allows the communications protocol translation component 84 to render an avatar associated with a resident that is logged out back into the virtual universe temporarily and even teleport that avatar to a location in the virtual universe from where he or she is being summoned. Conversely, the communications protocol translation component 84 can generate a rendering of an avatar of the party summoning the logged out resident onto the interface associated with the preferred communication device.

In order to perform these capabilities, the communication device 79 and the virtual universe 12 need to support the protocol translations performed by the communications protocol translation component 84. Below is a description of protocols and software interfaces for establishing and maintaining a communication link between the virtual universe and various real world communication devices.

Instant messaging software is one type of communication device or communication path that can be used by the real-time communication integration interface tool 53 to integrate a communication into the virtual universe 12. As an example, a virtual universe resident that is currently logged on can send an instant message to a virtual universe resident currently logged off. In this embodiment, the real-time communication integration interface tool 53 translates the virtual universe protocol for instant messaging into the non virtual universe protocol, sends the message to the non virtual universe instant messaging device, and receives replies within the virtual universe. In one embodiment, avatars can be supplied to an instant messaging provider and screen-name to the virtual universe and the virtual universe will associate that information with a UUID. Other embodiments may allow the avatar of the contacting resident to supply this information to the virtual universe. The virtual universe will be configured to interface with the instant messaging provider to transmit and receive messages.

Email software is another type of communication device or communication path that can be used by the real-time communication integration interface tool 53 to integrate a communication into the virtual universe 12. As an example, a virtual universe resident currently logged on can send an email from within the virtual universe to a resident who is not currently logged on. In one embodiment, the email contains an embedded link, much like an embedded http link sent using current email interfaces. The link contains the UUIDs of the email sender and receiver, and methods and logic to launch a helper application with a specialized interface of the virtual universe 12. In this embodiment, the application launches, registers the UUID of the email recipient, and establishes a communication path between the virtual universe and the specialized helper application. Through this link, the application can access a communication interface into the virtual universe, and the virtual universe resident currently logged off can find and communicate with the email sender within the virtual universe. For example, using the UUID of the email sender, the application can locate the sender's current location in the virtual universe and automatically teleport the email recipient to the email sender's location, where normal virtual universe communication can then proceed.

A running application is another type of communication device or communication path that can be used by the real-time communication integration interface tool 53 to integrate a communication into the virtual universe 12. As an example, a virtual universe resident can maintain a stand-alone application that acts as an interface component separate from the virtual universe client software, allowing the resident, when not logged into the virtual universe, to receive messages from within the virtual universe and summonses back into the virtual universe from other virtual universe residents. In one embodiment, this stand-alone application contains the methods and logic to connect to a specialized interface of the virtual universe 12, register itself, and register a communication path between the virtual universe and itself allowing communications to come from the virtual universe to the application.

A wireless telephone is another type of communication device or communication path that can be used by the real-time communication integration interface tool 53 to integrate a communication into the virtual universe 12. As an example, a virtual universe resident currently logged on can send a wireless text message, page, or voicemail, or place a wireless call directly to a virtual universe resident logged off using the interface component. In this embodiment, the real-time communication integration interface tool 53 translates the virtual universe protocol into the non virtual universe protocol for wireless telecommunication and receives replies within the virtual universe. In this embodiment, residents supply their phone carrier and telephone number to the virtual universe and the virtual universe will associate that information with a UUID. Other embodiments may allow the contacting resident to supply this information to the virtual universe. In this embodiment, the virtual universe will have the capability of interfacing with the telephone providers' messaging gateway for text messages or pages. The text message would contain a unique conversation key that must be the subject of any reply message in order for the virtual universe to route it to the appropriate avatar of a resident. In order to place a call or a voicemail the virtual universe will be equipped with logic and systems to place telephone calls. Additionally, methods can be used for text-to-speech generation or conversion of computer recorded sound for phone transmission. In this embodiment, the real-time communication integration interface tool 53 would route any return audio from the virtual universe's telephone bridge to the initiating resident.

A VoIP device is another type of communication device or communication path that can be used by the real-time communication integration interface tool 53 to integrate a communication into the virtual universe 12. As an example, a virtual universe resident currently logged on can place a VoIP call or send a VoIP voicemail directly to a virtual universe resident logged off using the real-time communication integration interface tool 53. In this embodiment, the real-time communication integration interface tool 53 will translate the virtual universe protocol into the non virtual universe protocol for VoIP telecommunication, and receives replies within the virtual universe. This service requires residents to supply their VoIP telephone number to the virtual universe and the virtual universe must associate that information with a UUID. Other embodiments may allow the contacting resident to supply this information to the virtual universe. In order to place a call or a voicemail the virtual universe in this embodiment will be equipped with logic and systems to place VoIP calls. Additionally, this embodiment can be with text-to-speech generation or conversion of computer recorded sound for VoIP transmission. In this embodiment, the real-time communication integration interface tool 53 would route any return audio from the virtual universe's VoIP bridge to the initiating resident.

Referring back to FIG. 4, the real-time communication integration interface tool 53 further comprises a communication link termination component 86 configured to terminate the communication link between the virtual universe and the communication device upon completion of the communication. In one embodiment, the communication link termination component 86 will remove the rendering of the avatar of the temporarily logged in resident from the virtual universe upon completion of the communication. Those skilled in the art will recognize that are a variety of ways to terminate the communication. For example, the communication link termination component 86 can send a message to the real-world communication device that the communication is finished, have the temporary avatar fade away, etc.

Below are examples of how the real-time communication integration interface tool 53 can be used to establish a communication from within a virtual universe to a resident that is logged out of the virtual universe and a communication established from the logged out resident to within the virtual universe.

For the example where the communication is established from within the virtual universe 12, consider the example of where resident 1 is logged into the virtual universe and he desires to communicate with resident 2 who is currently logged out. In one embodiment, resident 1 can click on his contact list and select the preferred method for contacting resident 2. In this example, resident 1 selects to contact resident 2 by cell phone. The virtual universe client 24 sends a signal to the virtual universe server 14 which causes the real-time communication integration interface tool 53 to initiate some translation of the messaging protocol which initiates a normal teleport request or an instant message into a signal that is convey over an Internet protocol to a translating service which is responsible for calling resident 2 on his cell phone. As a result, the cell phone of resident 2 rings and when it is picked up a signal is sent back to the real-time communication integration interface tool 53 indicating that a communication link has been established. The real-time communication integration interface tool 53 renders the avatar of resident 2 into the location in the virtual universe where resident 1 is located. Alternatively, the real-time communication integration interface tool 53 can also render the avatar of resident 1 into the interface of resident 2's cell phone if it is set up to perform that function. Because the cell phone of resident 2 is unaware of the type of communication that has been initiated, the voice of resident 2 is piped into the virtual universe through a translation protocol performed by the real-time communication integration interface tool 53. The translation protocols are performed and maintained until the conversation ends. Once the communication is completed, the avatar of resident 2 is removed from the virtual universe and from the interface of the cell phone if implemented with that capability.

For the example where the communication is established from outside the virtual universe 12 by resident 2 that is logged off the virtual universe to resident 1 that is logged in, the steps that would be performed are substantially symmetric to what was described above and thus a separate description of an example is not provided. Cases in which this type of communication might occur include: when the outside caller wishes to communicate temporarily from within the virtual universe with the virtual universe resident or there is no other mode of communication available.

In another embodiment of this invention, the real-time communication integration interface tool 53 is used as a service to charge fees for establishing communication links between residents in the virtual universe 12 and external communication devices in the real world used by residents that are not logged in the virtual universe. In this embodiment, the provider of the virtual universe or a third party service provider could offer this communication interface as a service by performing the functionalities described herein on a subscription and/or fee basis. In this case, the provider of the virtual universe or the third party service provider can create, deploy, maintain, support, etc., the real-time communication integration interface tool 53 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to establish communication links between residents in the virtual universe 12 and external communication devices in the real world used by residents that are not logged in the virtual universe. In this case, the real-time communication integration interface tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 5:
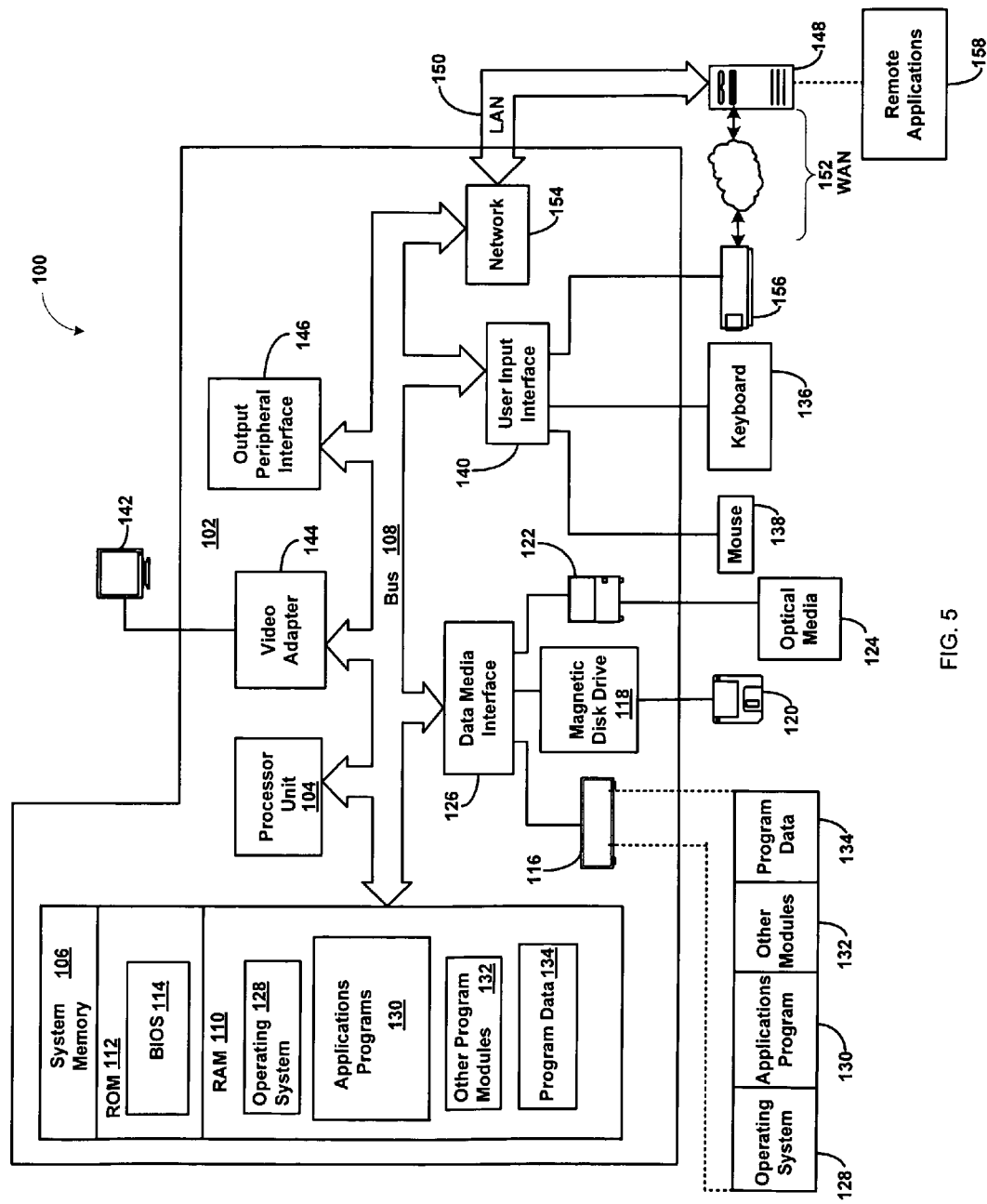
FIG. 5 shows a schematic of an exemplary computing environment in which elements of the networking environment shown in FIG. 1 may operate.

FIG. 5 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 5.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 5, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 5, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 5 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including the server array 14, the virtual universe client 24 and the real-time communication integration interface tool 53. In one embodiment, the one or more application programs 130 include components of the real-time communication integration interface tool 53 such as the communication request component 80, communication link component 82, policy table 83, communications protocol translation component 84, and communication link termination component 86.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 5 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 5 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for communication integration between a virtual universe and an external device. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for providing real-time communication integration between a virtual universe and a communication device external to the virtual universe, comprising:
receiving a request to initiate a communication between a first resident that is on-line in the virtual universe and a second resident that is logged out of the virtual universe via the communication device;
establishing a communication link between the virtual universe and the communication device in response to receiving the request, wherein the establishing of the communication link comprises using a policy table containing a plurality of preferred communication paths for contacting the second resident, wherein the plurality of preferred communication paths have been specified by the second resident as acceptable mediums for communication therewith, for each of the preferred communication paths, the policy table containing one of an individual avatar belonging to the second resident and a group avatar that the second resident is associated therewith, and any time constraint that designates a preferred time for contacting the individual avatar and the group avatar, wherein the individual avatar and the group avatar associated with each preferred communication path is used by the second resident to access the established communication link;
providing data for generating a rendering of avatars designated for use by the first and second resident, while the second resident is logged out of the virtual universe, in a display associated with the communication device in response to establishing the communication link between the virtual universe and the communication device; and
providing data for generating a rendering of another avatar designated for use by the second resident in the virtual universe in response to establishing the communication link between the virtual universe and the communication device, the providing of data for generating a rendering of the another avatar designated for use by the second resident in the virtual universe includes teleporting the another avatar designated for use by the second resident to a location in the virtual universe in which an avatar designated for use by the first resident is located.

2. The method according to claim 1, wherein the receiving of the request comprises issuing a summons to either the first resident in the virtual universe or the second resident logged out of the virtual universe indicating that there is a desire to initiate the communication between the first resident and the second resident.

3. The method according to claim 1, further comprising translating communication protocols associated with the virtual universe and the external device to facilitate the communication between the first resident and the second resident.

4. The method according to claim 1, further comprising removing the rendering of the another avatar designated for use by the second resident from the virtual universe upon completion of the communication between the first resident and the second resident.

5. The method according to claim 1, further comprising temporarily logging the second resident into the virtual universe in response to establishing the communication link between the virtual universe and the communication device.

6. The method according to claim 1, further comprising terminating the communication link between the virtual universe and the communication device upon completion of the communication between the first resident and the second resident.

7. The method according to claim 1, further comprising verifying the identities of the first resident and second resident prior to establishing the communication link.

8. A computer system for providing real-time communication integration between a virtual universe and a communication device external to the virtual universe, comprising:
at least one processing unit;
memory operably associated with the at least one processing unit; and
a real-time communication integration interface tool storable in memory and executable by the at least one processing unit, the tool comprising:
a communication request component configured to receive a request to initiate a communication between a first resident that is on-line in the virtual universe and a second resident that is logged out of the virtual universe via the communication device;
a policy table containing a plurality of preferred communication paths for contacting the second resident, wherein the plurality of preferred communication paths have been specified by the second resident as acceptable mediums for communication therewith, for each of the preferred communication paths, the policy table containing one of an individual avatar belonging to the second resident and a group avatar that the second resident is associated therewith, and any time constraint that designates a preferred time for contacting the individual avatar and the group avatar, wherein the individual avatar and the group avatar associated with each preferred communication path is used by the second resident in the communication with the first resident;
a communication link component configured to establish a communication link between the virtual universe and the communication device in response to receiving the request;
a communications protocol translation component configured to translate communication protocols associated with the virtual universe and the external device to facilitate the communication between the first resident and the second resident, wherein the communication protocol translation component provides data for generating a rendering of avatars designated for use by the first and second resident, while the second resident is logged out of the virtual universe, in a display associated with the communication device in response to establishing the communication link between the virtual universe and the communication device, the communication protocol translation component further configured to provide data for generating a rendering of another avatar designated for use by the second resident in the virtual universe in response to establishing the communication link between the virtual universe and the communication device, the providing of data for generating a rendering of the another avatar designated for use by the second resident in the virtual universe includes teleporting the another avatar designated for use by the second resident to a location in the virtual universe in which an avatar designated for use by the first resident is located.

9. The system according to claim 8, wherein the communication request component is configured to issue a summons to either the first resident in the virtual universe or the second resident logged out of the virtual universe indicating that there is a desire to initiate the communication between the first resident and the second resident.

10. A computer-readable storage device storing computer instructions, which when executed, enables a computer system to provide real-time communication integration between a virtual universe and a communication device external to the virtual universe, the computer instructions comprising:

receiving a request to initiate a communication between a first resident that is on-line in the virtual universe and a second resident that is logged out of the virtual universe via the communication device;

establishing a communication link between the virtual universe and the communication device in response to receiving the request, wherein the establishing of the communication link comprises using a policy table containing a plurality of preferred communication paths for contacting the second resident, wherein the plurality of preferred communication paths have been specified by the second resident as acceptable mediums for communication therewith, for each of the preferred communication paths, the policy table containing one of an individual avatar belonging to the second resident and a group avatar that the second resident is associated therewith, and any time constraint that designates a preferred time for contacting the individual avatar and the group avatar, wherein the individual avatar and the group avatar associated with each preferred communication path is used by the second resident to access the established communication link;

providing data for generating a rendering of avatars designated for use by the first and second resident, while the second resident is logged out of the virtual universe, in a display associated with the communication device in response to establishing the communication link between the virtual universe and the communication device; and providing data for generating a rendering of another avatar designated for use by the second resident in the virtual universe in response to establishing the communication link between the virtual universe and the communication device, the providing of data for generating a rendering of the another avatar designated for use by the second resident in the virtual universe includes teleporting the another avatar designated for use by the second resident to a location in the virtual universe in which an avatar designated for use by the first resident is located.

11. The computer-readable storage device according to claim 10, wherein the receiving of the request comprises instructions for issuing a summons to either the first resident in the virtual universe or the second resident logged out of the virtual universe indicating that there is a desire to initiate the communication between the first resident and the second resident.

12. The computer-readable storage device according to claim 10, further comprising instructions for translating communication protocols associated with the virtual universe and the external device to facilitate the communication between the first resident and the second resident.

13. The computer-readable storage device according to claim 10, further comprising instructions for temporarily logging the second resident into the virtual universe in response to establishing the communication link between the virtual universe and the communication device.

14. The computer-readable storage device according to claim 10, further comprising instructions for charging a communication fee to one of: the provider of the virtual universe, the first resident on-line in the virtual universe or the second resident that is logged out of the virtual universe.

15. A method for deploying a real-time communication integration interface tool for use in a computer system that provides real-time communication integration between a virtual universe and a communication device external to the virtual universe, comprising:

providing a computer infrastructure that:

receives a request to initiate a communication between a first resident that is on-line in the virtual universe and a second resident that is logged out of the virtual universe via the communication device;

establishes a communication link between the virtual universe and the communication device in response to receiving the request, wherein the establishing of the communication link comprises using a policy table containing a plurality of preferred communication paths for contacting the second resident, wherein the plurality of preferred communication paths have been specified by the second resident as acceptable mediums for communication therewith, for each of the preferred communication paths, the policy table containing one of an individual avatar belonging to the second resident and a group avatar that the second resident is associated therewith, and any time constraint that designates a preferred time for contacting the individual avatar and the group avatar, wherein the individual avatar and the group avatar associated with each preferred communication path is used by the second resident to access the established communication link;

provides data for generating a rendering of avatars designated for use by the first and second resident, while the second resident is logged out of the virtual universe, in a display associated with the communication device in response to establishing the communication link between the virtual universe and the communication device; and provides data for generating a rendering of another avatar designated for use by the second resident in the virtual universe in response to establishing the communication link between the virtual universe and the communication device, the providing of data for generating a rendering of the another avatar designated for use by the second resident in the virtual universe includes teleporting the another avatar designated for use by the second resident to a location in the virtual universe in which an avatar designated for use by the first resident is located.

* * * * *